Figure 1:
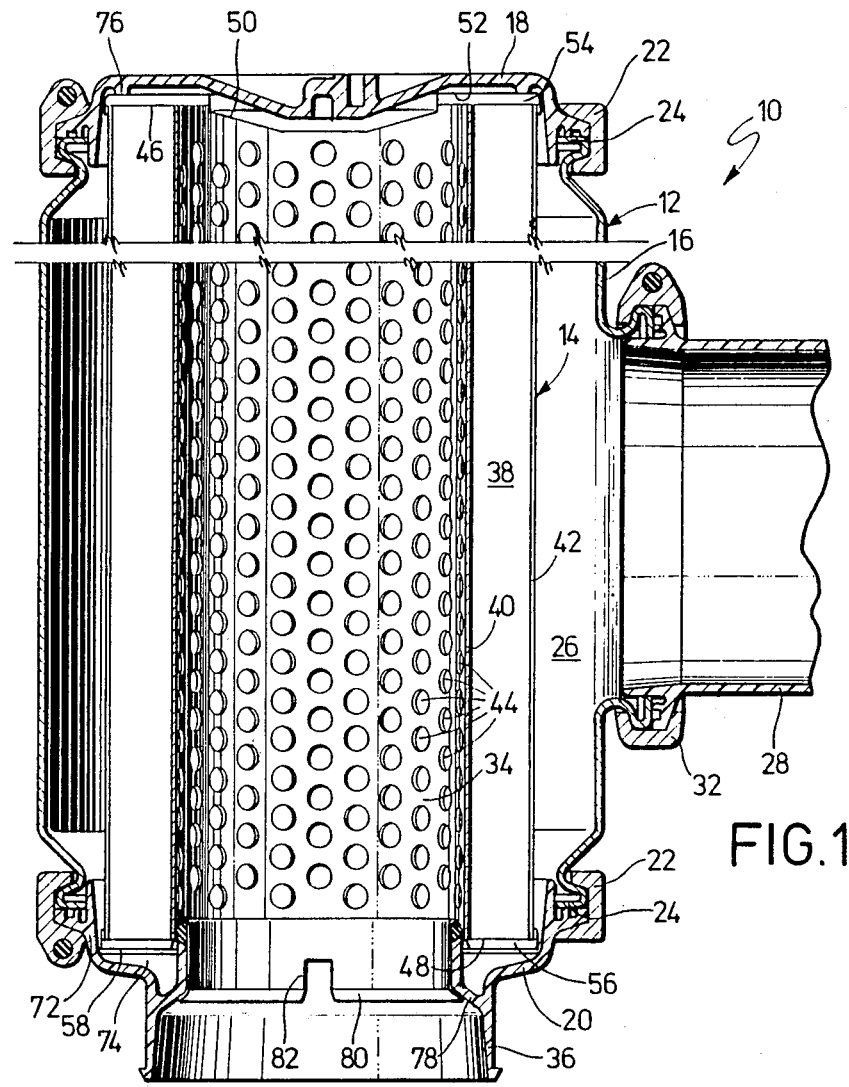

United States Patent [19]

Machado

[11] Patent Number: 4,759,783
[45] Date of Patent: Jul. 26, 1988

[54] SEALING ARRANGEMENT FOR INLET AIR FILTER

[75] Inventor: Joseph Machado, Attleboro, Mass.

[73] Assignee: Allied-Signal Inc., Morristown, N.J.

[21] Appl. No.: 67,187

[22] Filed: Jun. 25, 1987

[51] Int. Cl.[4] .............................................. B01D 46/10
[52] U.S. Cl. ...................................... 55/498; 55/502; 210/450
[58] Field of Search ................ 55/498, 502; 210/450, 210/448

[56] References Cited

U.S. PATENT DOCUMENTS

| | | | |
|---|---|---|---|
| 3,147,100 | 9/1964 | Wilber | 55/510 |
| 3,442,067 | 5/1969 | Swenson | 55/482 |
| 3,672,130 | 6/1972 | Sullivan et al. | 55/510 |
| 3,959,147 | 5/1976 | Oakley et al. | 210/323 T |
| 4,138,234 | 2/1979 | Kubesa | 55/374 |
| 4,197,101 | 4/1980 | Cote, Jr. et al. | 55/419 |
| 4,243,397 | 1/1981 | Tokar et al. | 55/487 |
| 4,278,455 | 7/1981 | Nardi | 55/337 |
| 4,312,651 | 1/1982 | Esaki et al. | 55/503 |
| 4,507,203 | 3/1985 | Johnston | 210/445 |
| 4,536,291 | 8/1985 | Hoffman et al. | 210/457 |
| 4,632,682 | 12/1986 | Ermannsdörfer | 210/232 |
| 4,634,527 | 1/1987 | Marshall | 210/232 |

*Primary Examiner*—Bernard Nozick
*Attorney, Agent, or Firm*—Ken C. Decker; William N. Antonis

[57] ABSTRACT

An air filter assembly includes a housing and an annular filter cartridge received within the housing. The cartridge includes a circumferentially extending, axially projecting, substantially smooth sealing surface circumscribing the inner diameter of the cartridge adjacent one end thereof. The housing includes a seal supporting projecting arm which projects into the chamber adjacent the sealing surface. A seal is mounted on the arm and retained thereon by a seal retaining clamp. The seal includes a radially projecting portion which sealingly engages the sealing surface on the cartridge.

18 Claims, 1 Drawing Sheet

U.S. Patent   Jul. 26, 1988   4,759,783

SEALING ARRANGEMENT FOR INLET AIR FILTER

This invention relates to a filter for filtering the inlet air of an internal combustion engine.

Air filters used for filtering inlet air for an internal combustion engine usually include a housing in which a removable, replaceable filter cartridge is mounted. Of course, it is essential for proper operation of the device that the cartridge be properly sealed to the housing. In conventional air filters, an elastomeric sealing material is mounted on one end of the cartridge, and the cartridge is urged into sealing engagement with a corresponding end of the housing by an axially directed force applied to the other end of the cartridge by the opposite end of the housing. Since proper operation of the air filter depends upon the integrity of the seal, and since the integrity of the seal between the cartridge and the housing depends upon the axial force applied to the cartridge, existing air cleaner housings must be made out of metal or another relatively strong material which does not expand or "creep" in the axial direction. Accordingly, even though plastic housing have many inherent advantages over metal housings, including being much lighter in weight and somewhat less expensive, plastic housings have not been widely used for automotive air filters because it is difficult to economically manufacture a plastic housing that had the same strength and resistance to "creep" as existing metal housings. Although such plastic housings have been used, they have been made out of special plastic formulations which are inherently quite expensive.

The present invention proposes a sealing arrangement between the cartridge and the housing of the air filter which is not dependent upon an axial force applied to the cartridge. Accordingly, although the sealing arrangement of the present invention may be used in air filters having metal housings, it is particularly adaptable to air filters having plastic housings. This is because the present invention permits conventional plastic material to be used to for the housing, since the seal between the housing and the cartridge does not require an axial force so that neither the strength of the housing nor its ability to withstand creep is a critical factor in the proper performance of the air filter.

Figure 2:
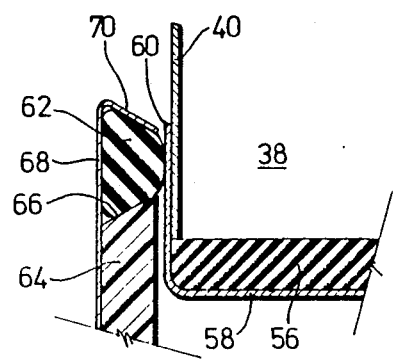

These and other advantages of the present invention will become apparent from the following description, with reference to the accompanying drawings, in which FIG. 1 is a longitudinal cross-sectional view of an automotive air filter made pursuant to the teachings of the present invention; and FIG. 2 is an enlarged cross-sectional view illustrating the engagement between the head and the cartridge used in the air filter illustrated in FIG. 1.

Referring now to the drawing, an air cleaner for filtering the inlet air of an internal combustion engine is indicated generally by the numeral 10. The air cleaner 10 includes a housing generally indicated by the numeral 12 which receives a filter cartridge generally indicated by the numeral 14. The housing 12, as indicated, may be made of a plastic material and indudes an annular side wall 16, the opposite open ends of which are closed by removable covers 18, 20. Each of the covers 18, 20 are provided with conventional clamping fixtures 22 which engage convoluted portions 24 at opposite ends of the side wall 16 to secure the covers 18, 20 to the side wall 16.

The side wall 16 cooperates with the cartridge 14 to define and annular inlet chamber 26 therebetween. The inlet chamber 26 communicates with an inlet tube 28 which is clamped to an inlet opening 30 defined on the side wall 16 by a releasable clamping members 32. The inlet tube 28 is communicated with a source of ambient air. The cartridge 14 is annular and defines an outlet chamber generally indicated by the numeral 34 within the cartridge 14. Outlet chamber 34 communicates with an outlet opening generally indicated by the numeral 36 in the end cover 20.

The cartridge 14 consists of pleated paper 38 comprising a circumferentially extending array of radially tapering pleats. The pleated paper 38 is conventional and will not be described in detail herein. The pleated paper 38 is supported by an inner metallic centertube 40 and by an outer metallic screen 42. The centertube 40 and screen 42 are each perforated as indicated at 44 to permit substantially uninhibited passage of air through the supporting tubes 40, 42.

The pleats in the pleated paper 38 terminate in an annular extending edges 46, 48. A closed end cap 50 bridges the chamber 40 and defines a circumferentially extending trough 52. A band of sealing compound, such as plastisol, is indicated at 54 and is dispensed into the trough 52. The edge 46 of the pleated paper 38 is embedded in the sealing compound 54, which seals the upper end of the pleats. Accordingly, the upper ends (viewing FIG. 1) of the pleats of the pleated paper 38 and the upper end of the chamber 34 are sealed by the end cap 50 and sealing compound 4. As discussed hereinabove, the lower end (viewing FIG. 1) of the chamber 34, as discussed above, communicates with the outlet opening 36. The edge 48 of the pleated paper 38 is embedded in a sealing compound generally indicated by the numeral 56 which is similar to the sealing compound 54. The sealing compound 56 is disposed in a trough defined by an annular end cap generally indicated by the numeral 58. The end cap 58 extends circumferentially around the pleated paper 38.

The radially inner edge of the end cap 58 terminates in an axially projection portion 60 which projects into the chamber 34 substantially parable to the centertube 40. The portion 60 thereby defines a circumferentially extending, substantially smooth sealing surface which is adapted to be sealing engaged by a circumferentially extending seal generally indicated by the numeral 62. The seal 62 is supported on a seal supporting arm 64 which projects from the end cap 20 into the chamber 34 substantially parallel to, but radially offset from, the portion 60 of the end cap 58. The seal 62 is supported upon the upper edge 66 of the arm 64 by a clamping ring generally indicated by the numeral 68. The clamping ring 68 terminates in a clamping portion 70 which cooperates with the upper surface 66 of the arm 62 to retain the seal 62 on the seal supporting arm 64. The edge 66 extends circumferentially around the chamber 34 and tapers axially in a direction opposite to the axial taper of the clamping portion 70 of the clamping ring 68. The axial tapers of the clamping portion 70 and edge 66 are designed to create a seal in the axial direction between the clamping portion 70, the surface 66, and the corresponding sides of the seal 62. Accordingly, sufficient gripping force is also provided to prevent the ring 68 from pulling free when the cartridge 14 is removed.

The surface 66 and clamping portion 70 cooperate to define a gap through which a projecting portion of the seal 62 projects to sealing engage the surface 60. The seal 62 is a conventional O-ring seal, but the seal is distorted by engagement of the clamping portion 70 and the tapered surface 66, which causes a portion of the seal to project radially through the aforementioned gap into sealing engagement with the surface 60. The arm 64 and clamping ring 68 extend axially from the cover 20 and cooperate with axially extending portion 72 of the cover 20 to define a circumferentially extending pocket 74 which receives the lowermost end of the cartridge 14 when the cartridge is installed in the housing. The upper end cover 18 is provided with stop 76 which cooperate with the pocket 74 to locate the cartridge 14 within the housing 12. The clamping ring 68 and arm 64 are provided with complemental, axially tapering engagement surfaces 78, 80 to thereby locate the clamping ring 68, (and therefore the seal 62) in the proper position on the surface 66 of the arm 64. The clamping ring 68 is provided with a relief 82 and is made out of resilient material so that the seal 62 may be installed on the arm 64 by forcing the clamping ring 68 axially downwardly viewing the Figure.

In operation, the various components of the air cleaner 10 are illustrated in their installed positions in which inlet air communicated through the inlet tube 28 passes through the pleated filter paper 38 before passing into the outlet chamber 34. Inlet air in outlet chamber 34 is communicated directly to the vehicle engine through the outlet 36. Of course, it is also possible to reverse the direction of air flow through the air cleaner 10. In that event, air would enter the opening 36 and leave the air cleaner through tube 28.

It will be noted that the seal between the housing 12 and the cartridge 14 is effected by engagement of the radial projecting portion of the seal 62 with the circumferentially extending surface 60. Accordingly, a fluid tight seal between the housing 12 and the cartridge 14 is not a function of the axial load on the cartridge 14. Although the cartridge 14 is located actually with respect to the housing by the projection 76 and the arms 72 and 64 defining the pocket 74, no substantial axial force need be applied to the cartridge. The cartridge can easily be removed by opening either of the end covers 18 or 20 and withdrawing the cartridge. When a new cartridge is installed, the seal between the cartridge 14 and the housing is automatically effected when the end cover is reinstalled in the position illustrated. Since it is not necessary to apply any substantial axial force on the cartridge 14 in order to effect a fluid tight seal, small changes in the axial length of the annular wall 16, due, for example, to manufacturing tolerances, expansion due to thermal changes etc. will not affect the integrity of the seal between the cartridge and the housing. Furthermore, since the housing 12 is not required to exert an axial force on the cartridge 14 in order to effect a seal, it is not necessary to manufacture the housing 12 from, for example, steel in order to be strong enough to take the axial load. Instead, since the housing 12 bears little or no axial load, the housing can be made out of conventional plastic material. Of course, while the invention is useful in air cleaners having plastic housing, it can also be used in housings made from steel or any other suitable material.

We claim:

1. Air filter assembly comprising a housing having a circumferentially extending side wall and a pair of end covers for opposite ends of said side wall, said housing further including an inlet opening and an outlet opening, said housing defining a flow path between the inlet and outlet openings, a annular filter cartridge received within said housing, said cartridge being mounted in the flow path between the inlet and outlet openings and including a circumferentially extending, substantially smooth sealing surface projecting axially from one end of said cartridge, and an annular elastomeric seal carried by said housing, said housing including seal supporting means supporting said seal radially offset from said sealing surface and axially offset from said one end of the cartridge, and retaining means retaining said seal on the seal supporting means, said seal including a radially projecting portion when retained on said supporting means by said retaining means, said radially projecting portion sealingly engaging the sealing surface on said cartridge, due to the radial contact with respect to the cartridge of the radially projecting portion of the sealing surface, said sealing surface having a length sufficiently long to permit relative axial movement between the radially projecting portion and the sealing surface without affecting the integrity of the seal between the radially projecting portion and said sealing surface.

2. Air filter assembly as claimed in claim 1, wherein said retaining means is a circumferentially extending ring mounted on said housing.

3. Air filter assembly as claimed in claim 1, wherein said retaining means includes a clamping portion cooperating with said seal supporting means to define a gap therebetween, said seal being installed in said gap, said radially projecting portion extending from said gap to engage said sealing surface.

4. Air filter assembly as claimed in claim 3, wherein said seal clamping portion and the seal supporting means to sealing engage corresponding portions of the seal.

5. Air filter assembly as claimed in claim 3, wherein said annular filter cartridge defines a chamber within said cartridge, said sealing surface circumscribing said chamber.

6. Air filter assembly as claimed in claim 5, wherein said seal and at least a portion of said seal supporting means and said retaining means project into said chamber to position said seal adjacent said sealing surface.

7. Air filter assembly as claimed in claim 6, wherein said annular filter cartridge is defined by upper and lower annular ends, a circumferentially extending annular end cap for each of said ends, one of said end caps enclosing one of said annular ends and including an axially projecting portion projecting into said chamber, said axially projecting portion of said one end cap carrying said sealing surface.

8. Air filter assembly as claimed in claim 7, wherein one of said openings extends through one of said end covers, said one end cover including means receiving said one annular end of the filter cartridge.

9. Air filter assembly as claimed in claim 8, wherein said seal supporting means includes an arm extending from said housing into said annular chamber.

10. Air filter assembly as claimed in claim 9, wherein said retaining means and said seal supporting means includes complemental mounting structure to mount said retaining means on said seal supporting means and to thereby position said clamping portion of said retaining means to engage said seal.

11. Air filter assembly as claimed in claim 1, wherein said annular filter cartridge defines an annular chamber within said cartridge, said sealing surface circumscribing said annular chamber.

12. Air filter assembly as claimed in claim 11, wherein said seal and at least a portion of said seal supporting means and said retaining means project into said annular chamber to position said seal adjacent said sealing surface.

13. Air filter assembly as claimed in claim 12, wherein said annular filter cartridge is defined by upper and lower annular ends, a circumferentially extending annular end cap for each of said ends one of said end caps enclosing one of said annular ends and including an axially projecting portion projecting into said chamber, said axially projecting portion of said one end cap carrying said sealing surface.

14. Air filter assembly as claimed in claim 1, wherein one of said openings extends through one of said end covers and said annular filter cartridge is defined by upper and lower annular ends, said one end cover including means receiving a corresponding one of said annular ends of said cartridge.

15. Air filter assembly as claimed in claim 14, wherein said receiving means is an annular cavity circumscribing said one end cover.

16. Air filter assembly as claimed in claim 15, wherein said seal retaining means and said seal supporting means include complemental mounting structure to mount said retaining means on said seal supporting means.

17. Air filter assembly as claimed in claim 16, wherein said retaining means includes a clamping portion, said complemental mounting structure positioning said clamping portion with respect to said seal supporting means to define a gap therebetween receiving said seal.

18. Air filter assembly as claimed in claim 17 wherein said clamping portion and the seal supporting means sealingly engage corresponding portions of the seal.

* * * * *